United States Patent Office 3,226,359
Patented Dec. 28, 1965

3,226,359
HYDROCHLORINATION OF POLYISOPRENE IN PRESENCE OF PHENOLS
George W. Ferner, Cuyahoga Falls, Ohio, assignor to The Goodyear Tire & Rubber Company, Akron, Ohio, a corporation of Ohio
No Drawing. Filed Mar. 19, 1962, Ser. No. 180,836
10 Claims. (Cl. 260—45.95)

This invention relates to the hydrohalide derivatives of polyisoprene containing a major amount of cis-1,4-polyisoprene. More particularly, it relates to an improved process for the production of polyisoprene hydrochloride containing cis-1,4-polyisoprene having improved light aging properties.

The hydrohalide derivative of natural rubber is well-known and is commonly referred to as rubber hydrochloride. Films made of rubber hydrochloride have a tendency to deteriorate when subjected to heat and light, particularly ultraviolet light. Many heat and light stabilizers have been disclosed in the literature, all of which have been added to the rubber hydrohalide in a conventional manner to impart the property of heat and light stability.

A particularly desirable class of heat and light stabilizers are the phenols, and particularly the phenols containing at least two substituents, and especially the di- and tri-substituted phenols, for example the alkylated phenols. Of particular value is 2,6-ditertiary butyl p-cresol, butylated hydroxy anisole, creosol, eugenol, and isoeugenol.

It has been discovered, however, that the phenols having light and heat stabilizing properties, particularly those listed above, do not exhibit a stabilizing effect on the rubber hydrochloride when added to the rubber after it has been hydrochlorinated, but only when added to the rubber prior to hydrochlorination. The hydrochlorination of the rubber may be carried out in accordance with the well-known conventional methods as, for example, by dissolving the rubber in a solvent therefor and then reacting the dissolved rubber with hydrogen chloride in the presence of the stabilizing agents useful in the present invention.

Any suitable liquid having a solvent effect on rubber containing at least 51% cis-1,4-polyisoprene may be used and include benzene, chloroform, toluene, and the like. With respect to rubber containing at least 90% of cis-1,4-polyisoprene, benzene and toluene are the preferred solvents. The following example is typical of the process of the present invention.

EXAMPLE 1

To 100 parts of benzene was added 7 parts of pale crepe natural rubber, which had been milled for 30 minutes to promote dissolution of the rubber in the benzene solvent. One part of 2,6-ditertiary butyl p-cresol per 100 parts of rubber was added to the cement with stirring to promote a homogeneous mixture.

The cement was cooled to 10° C. and hydrogen chloride gas passed into the cement for 6 hours with agitation to increase the weight of the reactants to about 11 parts, which corresponds to a slight excess of available hydrogen chloride over that theoretically required. The hydrogen chloride is dissolved in the cement and allowed to react with the rubber until the desired hydrochlorination has been effected, which takes about 20 hours to produce 95 to 98% saturation of the rubber. The resulting rubber hydrochloride was then treated with soda ash to remove excess hydrogen chloride, filtered, and a film cast by spreading the filtered cement onto a glass surface with a doctor knife and allowing to dry to form a film 1 mil thick.

Other rubbers of the polyisoprene type and containing 51% or more of cis-1,4-polyisoprene made in accordance with well-known processes, but employing different catalyst systems, were also subjected to hydrochlorination in a solvent containing a phenolic antioxidant inert toward hydrogen chloride and compared with the same product resulting from the hydrochlorination of a solution of the polyisoprene rubber, but in the absence of the phenolic antioxidant which, in the second case, was added after hydrochlorination of the polyisoprene rubber was completed. The phenolic antioxidant was added to the solution of hydrochlorinated polyisoprene rubber just prior to the time the solution of hydrochlorinated rubber was cast into a film. The following table sets forth the results of these tests:

Table I

| Ex. | Rubber | Antioxidant (1 Pt.) | Antioxidant Added Prior to Hydrochlorination, Fadeometer, Hours | Antioxidant Added After Hydrochlorination, Fadeometer, Hours |
|---|---|---|---|---|
| 2 | Containing 92% cis-1,4-polyisoprene | Butylated hydroxy toluene [2] | 51 | 15 |
| 3 | 90% of a 92% cis-1,4-polyisoprene/10% of natural rubber containing 98% cis-1,4-polyisoprene. | do.[2] | 47 | 15 |
| 4 | Natural rubber supra | do.[2] | 51 | 15 |
| 5 | Natural rubber supra [1] | do.[2] | 57 | 15 |
| 6 | Natural rubber supra | Butylated hydroxy anisole | 26 | 15 |
| 7 | do | Cresol | 27 | 15 |
| 8 | do | Eugenol | 22 | 15 |
| 9 | do | Isoeugenol | 30 | 20 |

[1] One part butylated hydroxy toluene added before mill breakdown.
[2] 2,6-ditertiary butyl p-cresol.

Other examples of antioxidants that may be employed are:

2,2'-methylenebis(6-tert-butyl-4-methyl phenol)
2,2'-methylenebis(6-tert-butyl)-4-ethyl phenol)
2,2'-methylenebis[4-methyl-6-(1,1,3,3,-tetramethyl) butyl phenol]
4,4'-bis(2-tert-butyl-5-methyl phenol) sulfide
4,4'-butylidine-bis(2-tert-butyl-5-methyl phenol)
2,2'-methylenebis(4,6-dimethyl phenol)
2-tert-butyl-4(4-tert-butyl phenyl) phenol
2-tert-butyl-4-phenyl phenol
2,6-dibenzyl-4-methyl phenol
2-benzyl-4-methyl phenol
2-benzyl-6-tert-butyl-4-methyl phenol
2-benzyl-6-tert-butyl-4-ethyl phenol
2,4-dimethyl-6-(1-methyl-1-cyclohexyl) phenol
2,6-diisopropyl-4-methyl phenol
2,4-dimethyl-6-isopropyl phenol 2-tert-butyl-4,6-dimethyl phenol
2-tert-butyl-4-methyl phenol
2-(1,1,3,3-tetramethyl butyl)-4-methyl phenol
2,4,6-trimethyl phenol
2,6-di-tert-butyl-4-methyl phenol
2,6-di-tert-butyl-4-ethyl phenol
2,6-diisopropyl phenol
2,6-di-tert-butyl-4-phenyl phenol
2,6-di-tert-butyl-4(4-tert-butyl phenyl) phenol Mixtures of the foregoing may be used. The foregoing antioxidants are those which contain at least one and not more than two benzene rings.

The incorporation of the stabilizers of this invention in the rubber cement prior to hydrochlorination thereof, in addition to producing the unexpected results with regard to the stabilization of the hydrogen halide derivative thereof, is also a more facile, efficient and economical manner of incorporating the stabilizer than may be realized by incorporation of the stabilizers, either by milling them into the rubber hydrochloride or adding them to a solution of the rubber hydrohalide.

The reason for this unexpected result in regard to protection of the rubber hydrohalide against deterioration from ultraviolet light, heat and the like, is not understood, but apparently some beneficial reaction takes place when the stabilizer is present in the cement during hydrohalogenation thereof that is not obtained when the stabilizer is added to the rubber after it has been hydrochlorinated.

While certain representative embodiments and details have been shown for the purpose of illustrating the invention, it will be apparent to those skilled in this art that various changes and modifications may be made therein without departing from the spirit or scope of the invention.

What is claimed is:

1. The process of making a hydrochloride derivative of a polyisoprene rubber which comprises subjecting a solution of polyisoprene rubber containing at least 51% of cis-1,4-polyisoprene and having admixed therein an effective amount of a phenolic compound containing one and not more than two benzene rings for stabilizing said derivative against degradation by heat and light, the phenolic compound containing on the benzene ring in addition to the hydroxyl, at least 2 and not more than 3 substituents selected from the group consisting of methoxy, alkyl having from 1 to 8 carbon atoms, benzyl, phenyl, cyclohexyl and alkyl substituted phenyl, wherein not more than one of the same substituents is present on the benzene ring other than alkyl and benzyl substituents, to the hydrochlorinating effect of gaseous hydrogen chloride.

2. The process of claim 1 wherein the polyisoprene rubber contains at least 90% of cis-1,4-polyisoprene.

3. The process of claim 1 wherein the phenolic compound is 2,6-dietertiary butyl para-cresol.

4. The process of claim 1 wherein the phenolic compound is butylated hydroxy anisole.

5. The process of claim 1 wherein the phenolic compound is creosol.

6. The process of claim 1 wherein the phenolic compound is eugenol.

7. The process of claim 1 wherein the phenolic compound is isoeugenol.

8. The process of claim 1 wherein about one part of the phenolic compound is used.

9. A heat and light stable hydrochloride derivative of a polyisoprene rubber produced in accordance with the process of claim 1.

10. A heat and light stable film of a hydrochloride derivative of a polyisoprene rubber made in accordance with the process of claim 1 wherein the stabilizer present in the rubber during hydrochlorination is selected from the group consisting of 2,6-ditertiary butyl p-cresol, butylated hydroxy anisole, creosol, eugenol, and isoeugenol.

References Cited by the Examiner
UNITED STATES PATENTS

| | | | |
|---|---|---|---|
| 2,536,789 | 2/1951 | Amerongen | 260—94 |
| 2,596,787 | 5/1952 | Veersen | 260—94 |
| 2,654,679 | 10/1953 | Goppel | 260—94 |
| 2,880,256 | 3/1959 | Davy et al. | 260—810 |
| 2,980,656 | 4/1961 | Jones et al. | 260—94 |
| 2,999,842 | 9/1961 | Csendes | 260—45 |

LEON J. BERCOVITZ, *Primary Examiner.*